United States Patent [19]

Uemura et al.

[11] Patent Number: 5,720,026
[45] Date of Patent: Feb. 17, 1998

[54] INCREMENTAL BACKUP SYSTEM

[75] Inventors: Jose Uemura; Takashi Sakakura, both of Tokyo, Japan

[73] Assignee: Mitsubishi Denki Kabushiki Kaisha, Tokyo, Japan

[21] Appl. No.: 643,995

[22] Filed: May 7, 1996

[30] Foreign Application Priority Data

Oct. 6, 1995 [JP] Japan ................................. 7-260106

[51] Int. Cl.$^6$ ................................................. G06F 12/00
[52] U.S. Cl. ........................................ 395/182.04; 395/620
[58] Field of Search .............................. 395/182.04, 620, 395/616, 441, 489

[56] References Cited

U.S. PATENT DOCUMENTS

| | | | |
|---|---|---|---|
| 5,226,154 | 7/1993 | Kondoh ............................... | 395/620 |
| 5,263,154 | 11/1993 | Eastridge et al. ................. | 395/182.04 |
| 5,276,860 | 1/1994 | Fortier et al. ...................... | 395/182.04 |
| 5,321,832 | 6/1994 | Tanaka et al. ...................... | 395/620 |
| 5,454,099 | 9/1995 | Myers et al. ....................... | 395/182.04 |
| 5,522,037 | 5/1996 | Kitagawa et al. .................. | 395/183.16 |
| 5,596,709 | 1/1997 | Bond et al. ........................ | 395/182.05 |

FOREIGN PATENT DOCUMENTS

| | | |
|---|---|---|
| 0410630 | 1/1991 | European Pat. Off. . |
| 0541281 | 5/1993 | European Pat. Off. . |
| 0566966 | 10/1993 | European Pat. Off. . |
| 2-42523 | 2/1990 | Japan . |

*Primary Examiner*—Ly Hua
*Attorney, Agent, or Firm*—Wolf, Greenfield & Sacks, P.C.

[57] ABSTRACT

An incremental backup system includes a storage unit, which is accessed in block units of a predetermined size, for storing data to be backed up. Difference map information stored in the storage unit records the latest backup generation number, indicating when data in each block has been updated. A latest update generation management mechanism manages backup generation numbers for each block. A difference management mechanism inputs and stores backup data in a backup unit. The backup data includes data in a block of the storage unit which is updated in a specified backup generation based on the difference map information, a position of the block in the storage unit, and a backup generation in which the block has been updated.

11 Claims, 10 Drawing Sheets

| | |
|---|---|
| EXECUTING FLAG = ON | 401 |
| CURRENT EFFECTIVE DIFFERENCE GENERATION NUMBER = 1 | 402 |
| DIFFERENCE MAP INFORMATION SIZE = 512KB | 403 |
| DIFFERENCE MAP INFORMATION DISK NAME = /dev/dsk/mapvol | 404 |
| DIFFERENCE MAP INFORMATION OFFSET = 0 | 405 |
| BLOCK SIZE = 2KB | 406 |
| NO. OF ENTRIES OF DIFFERENCE MAP INFORMATION = 1024 x 1024 | 407 |
| DIFFERENCE MAP INFORMATION ADDRESS = 0xf 24004000 | 408 |
| VOLUME NAME OF VOLUME TO BE BACKED UP = /dev/dsk/vol0 | 409 |
| VOLUME SIZE OF VOLUME TO BE BACKED UP = 2GB | 410 |

| | |
|---|---|
| GENERATION 1 | NO. OF UPDATE BLOCKS = 3 |
| GENERATION 2 | NO. OF UPDATE BLOCKS = 4 |
| GENERATION 3 | NO. OF UPDATE BLOCKS = 2 |
| GENERATION 4 | NO. OF UPDATE BLOCKS = 6 |
| GENERATION 15 | NO. OF UPDATE BLOCKS = 0 |

INCREMENTAL BACKUP SYSTEM

BACKGROUND OF THE INVENTION

1. Field of the Invention

This invention relates to a data backup system intended for efficient operation of data backup indispensable for safe operation of a computer system.

2. Description of the Related Art

In safe operation of computer systems, many systems back up application data of databases, etc., and data of the computer systems themselves for rapid recovery when fault occurs in the computer system. If the hardware is recovered from the fault and the data of the computer system is again stored on the disk unit where it should be stored, the computer system can restart operation. In a database to which the invention is applied, the most recent backup data is stored in the disk unit where it should be stored and the operation performed for the database between the instant when the backup data was gotten and the instant when the fault occurred in the computer system is reexecuted in time sequence based on the history, whereby the database can be recovered to the state at the fault occurrence time.

To back up data in a database, to provide consistency of the data in the database, general write operation of the database data called check pointing is performed, then operation of the database is temporarily stopped to inhibit new writing into the database and data is saved, namely, disk data where the database data is stored is copied onto magnetic tape, etc.

Thus, it is necessary to once stop operation of the database to backup the database data. For this reason, generally for backup work, for example, operation of the database is stopped after daily work terminates, and the database data is sorted and document processing is performed, then the data is saved.

However, in recent years, some databases have become giant to several hundred GB and the database operation time has been extended; it is becoming difficult on operation to stop the database as long as the necessary time for backup. Thus, the system may be forced to operate the database without backup for long hours while being fraught with the risk of computer system fault.

Hitherto, in UNIX systems, etc., incremental backup wherein only the difference data updated since the most recent backup is backed up without backing up the entire data has been provided in a file system. However, the incremental backup in the file system is to check all files in the file system to be backed up for the update time and if the update time is newer than the last backup execution time, save the file. For example, if the file is a giant database file, the whole file must be backed up although the data update portion is slight for the whole file.

An art for solving the above-mentioned problem is disclosed in Japanese Patent Laid-Open No. Hei 2-42523, wherein the storage area of a magnetic disk storage is separated into blocks for management and a bit map consisting of bits corresponding to the blocks is used to record whether or not the data in each block has been updated within a time period, whereby the difference data to be backed up can be known in disk block units.

To back up database data, operation of the database needs to be temporarily stopped to maintain consistency of the backup data as the database data. In recent years, as databases have become giant, the time required for backup has also increased, thus making it difficult to operate the system while executing sufficient backup.

Then, attention is given to the incremental backup system for backing up only updated or added data without backing up full data. However, the incremental backup system installed in the UNIX systems, etc., backs up the whole file depending on the last update time, thus always backs up the full file used by an application repeating reference/update to/of one file like a database; it is insufficient.

In the modified block recording system as a disk function for each disk as in the art disclosed in Japanese Patent Laid-Open No. Hei 2-42523, incremental backup can only be executed in disk units at regular time intervals regardless of how many difference blocks exist, and if any one of generations of the incremental backup is lost, it is also made impossible to reproduce the backup data.

SUMMARY OF THE INVENTION

This invention has been made in view of the above circumstances, and therefore an object of the invention is to provide an incremental backup system which can back up only updated blocks on disk over generations and provide efficient and highly reliable backup for data backup in a computer system.

According to the invention, there is provided an incremental backup system comprising:

a storage unit for storing data to be backed up and being separated into a plurality of blocks of a predetermined size and accessed in the block units;

difference map information being stored in the storage unit for recording the latest backup generation in which data in each block has been updated for each block;

generation record means, when data in one of the blocks is updated, for recording the latest backup generation in the difference map information corresponding to the block;

a backup unit for storing backup data; and incremental backup means for inputting data in a block of the storage unit updated in a specified backup generation based on the difference map information and storing data in the block, a position of the block in the storage unit, and the backup generation in which the block has been updated in the backup unit as backup data.

The incremental backup system may further include full backup means for storing all of the data stored in the storage unit in the backup unit and initializing the backup generations, wherein the incremental backup means updates the backup generations after the backup data is stored.

In the incremental backup system, the full backup means reserves an area for storing the difference map information in the storage unit and initializing the information.

The incremental backup system may further include a controller for controlling the storage unit and the backup unit, the generation record means, the incremental backup means, and the full backup means being provided in the controller.

In the incremental backup system, the incremental backup means may comprise:

difference management means for inputting data in a block of the storage unit updated in a specified backup generation based on the difference map information and collecting data in the block, a position of the block in the storage unit, and the backup generation in which the block has been updated for output; and a control command for storing the data output by the difference management means in the backup unit as backup data.

The incremental backup system may further include difference restoration means for inputting the backup data stored in the backup unit and restoring the input block data to the storage unit based on the position of the block in the storage unit and the backup generation in which the block has been updated to the difference map information.

In the incremental backup system, the difference restoration means may comprise:

a control command for inputting the backup data stored in the backup unit and outputting the input backup data; and difference management means for inputting the backup data output by the control command and restoring the input block data to the storage unit based on the position of the block in the storage unit and the backup generation in which the block has been updated to the difference map information.

In the incremental backup system, the incremental backup means stores check sum data for the block data in the backup unit for each block data, and the difference restoration means uses the check sum data stored in the backup unit to check whether or not the block data stored in the backup unit is valid.

The incremental backup system may further include number-of-update-blocks information for recording the number of data update blocks for each backup generation; and number-of-update-blocks record means for adding the number of update blocks in the number-of-update-blocks information corresponding to the latest backup generation when the data is updated.

The incremental backup system may further include a control command for inputting the number-of-update-blocks information and outputting the number of update blocks in the number-of-update-blocks information corresponding to a specified backup generation.

In the incremental backup system, the storage unit may be a virtual logical disk unit made up of physical disk units.

The above and other objects and features of the present invention will be more apparent from the following description taken in conjunction with the accompanying drawings.

DETAILED DESCRIPTION OF THE PREFERRED EMBODIMENTS

Referring now to the accompanying drawings, there are shown preferred embodiments of the invention.

Figure 1:
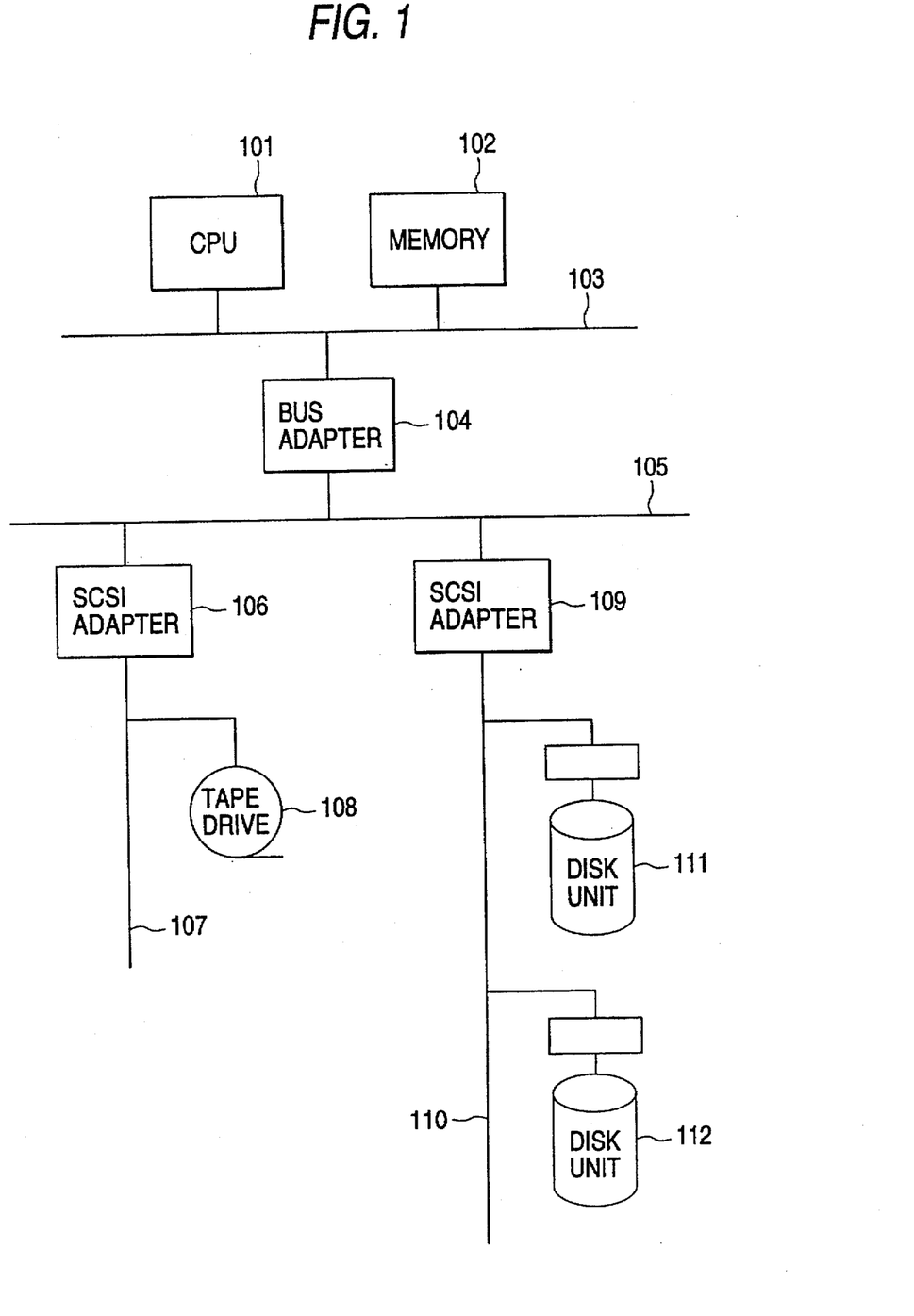
FIG. 1 is a block diagram showing the hardware configuration of an incremental backup system according a first embodiment of the invention.

Embodiment 1:

FIG. 1 is a block diagram showing an example of the hardware configuration of a computer system to which the invention is applied.

In FIG. 1, numeral 101 denotes a CPU (central processing unit), numeral 102 is a memory, numeral 103 is a memory bus for connecting the CPU 101 and the memory 102, numeral 104 is a bus adapter connected to the memory bus 103, numeral 105 is an input/output bus connected to the bus adapter 104, and numerals 106 and 109 are normal SCSI adapters connected to the input/output bus 105. Numeral 107 is an SCSI bus deriving from the SCSI bus adapter 106, numeral 108 is a tape drive as a backup unit connected to the SCSI bus 107 for storing backup data, and numeral 110 is an SCSI bus deriving from the SCSI adapter 109. Numerals 111 and 112 are disk units connected to the SCSI bus 110. The disk units 111 and 112 store data to be backed up and are accessed in 2 KB block units. The full backup and incremental backup of the data stored in the disk units 111 and 112 are stored in the tape drive 108.

The full backup is to back up all of data to be backed up in the disk units 111 and 112 and the incremental backup is to back up only the data updated since the most recent backup, which will be hereinafter referred to as difference data.

Figure 2:
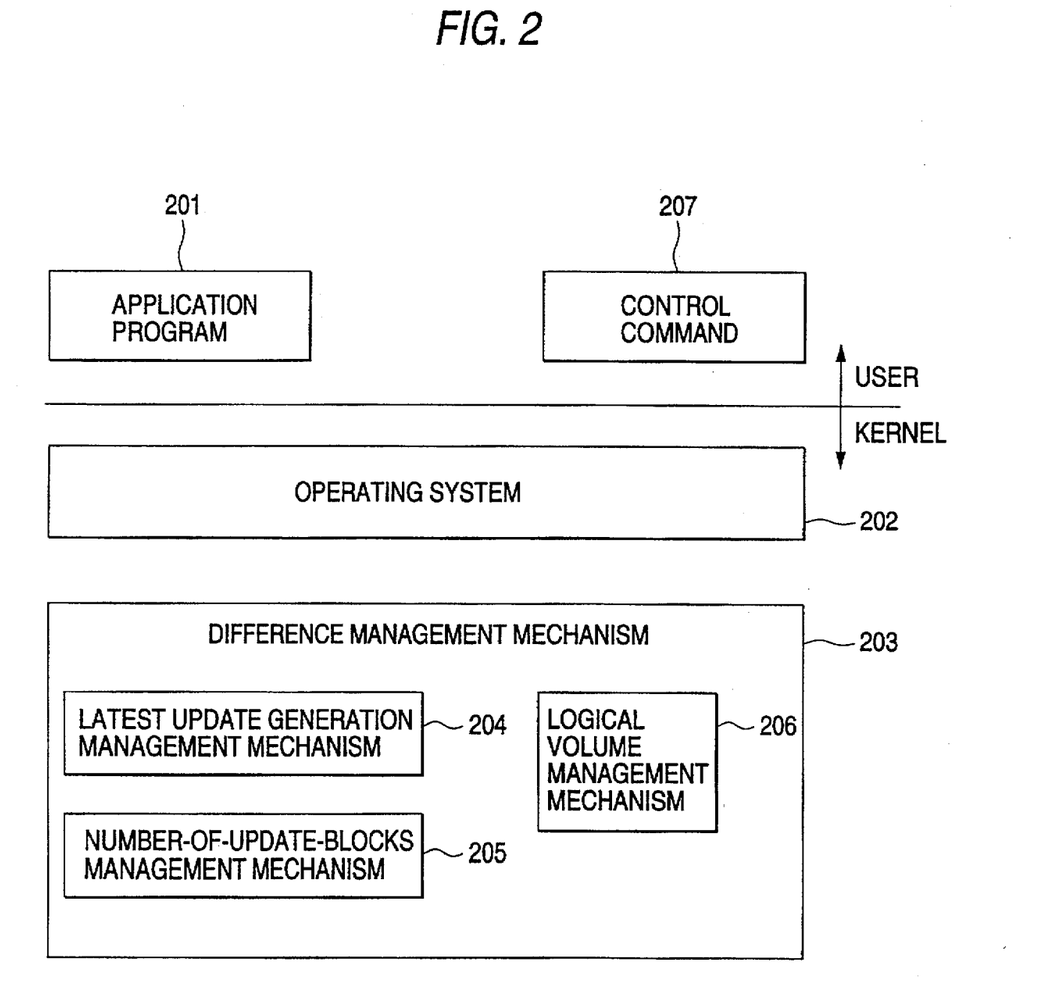
FIG. 2 is a block diagram showing the software configuration of the incremental backup system in the first embodiment of the invention.

FIG. 2 is a block diagram showing an example of the software configuration of the computer system to which the invention is applied.

In FIG. 2, numeral 201 is an application program which references/updates disk data and numeral 202 is an operating system (the embodiment of the invention uses UNIX). Numeral 203 is a difference management mechanism for managing difference data in disk blocks. It is built in the system as a pseudo device driver under the control of the operating system. Numeral 204 is a latest update generation management mechanism for managing backup generation numbers for each block in the disk units 111 and 112. Numeral 205 is a number-of-update-blocks management mechanism for managing the number of update blocks in the disk units 111 and 112 for each backup generation. Numeral 206 is a logical volume management mechanism for managing virtual logical disk units made up of physical disk units like the disk units 111 and 112. The difference management mechanism 203, the latest update generation management mechanism 204, the number-of-update-blocks management mechanism 205 for each generation, and the logical volume management mechanism 206 are in the same position when viewed from the system. Numeral 207 is a control command used by the system manager for controlling the difference management mechanism 203. The control command can be used to execute full backup and incremental backup.

Figure 3:
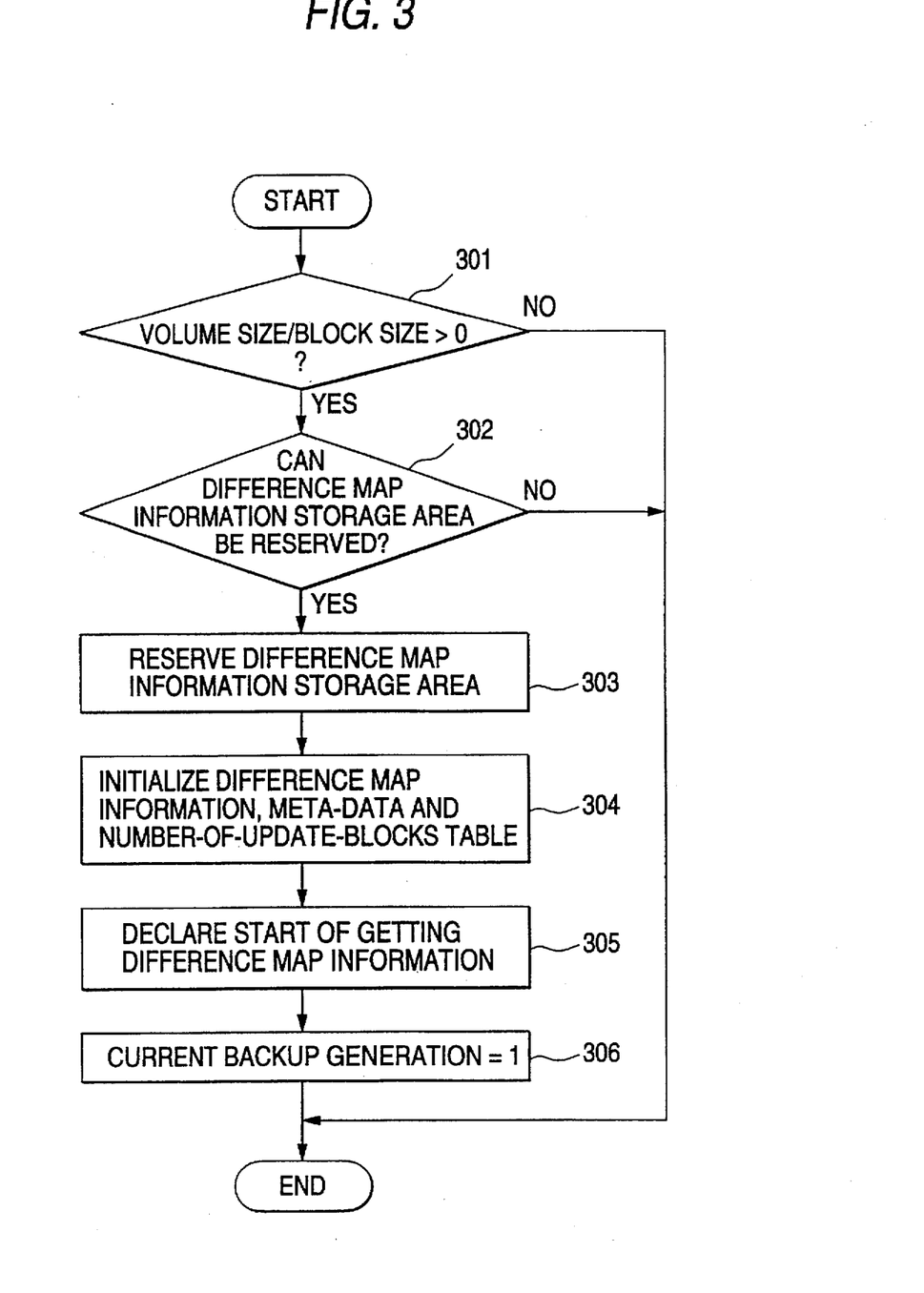
FIG. 3 is a flowchart of an initialization process of incremental backup in the first embodiment of the invention.

FIG. 3 is a flowchart showing the operation of the difference management mechanism 203 at the full backup time.

Figure 4:
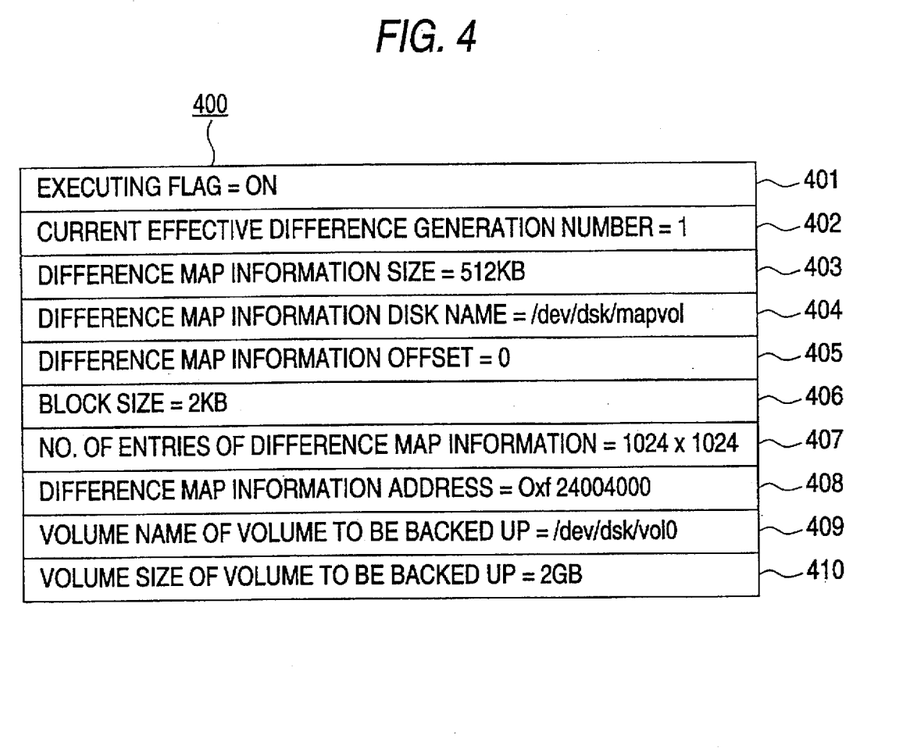
FIG. 4 is a diagram showing meta-data for incremental backup in the first embodiment of the invention.

FIG. 4 shows meta-data 400 for incremental backup.

Figure 5:
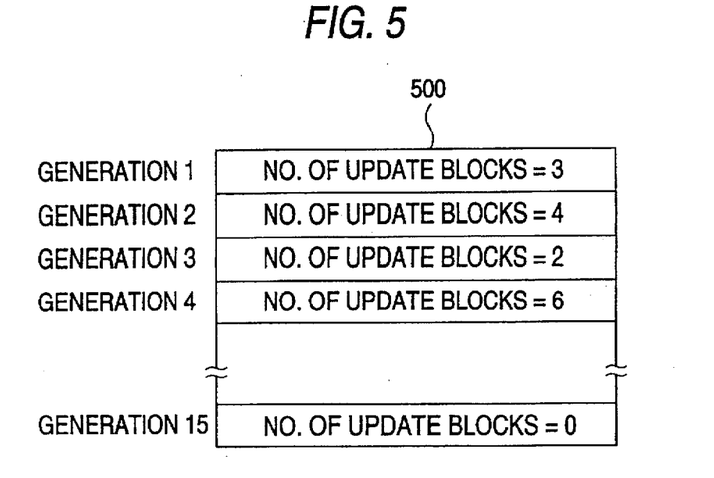
FIG. 5 is a diagram showing a number-of-update-blocks table in the first embodiment of the invention.

FIG. 5 shows a number-of-update-blocks table 500 in which the number of update blocks for each generation is registered. The top entry in the number-of-update-blocks table 500 indicates that the number of update blocks of generation 1 is three, and the next entry indicates that the number of update blocks of generation 2 is four.

Figure 6:
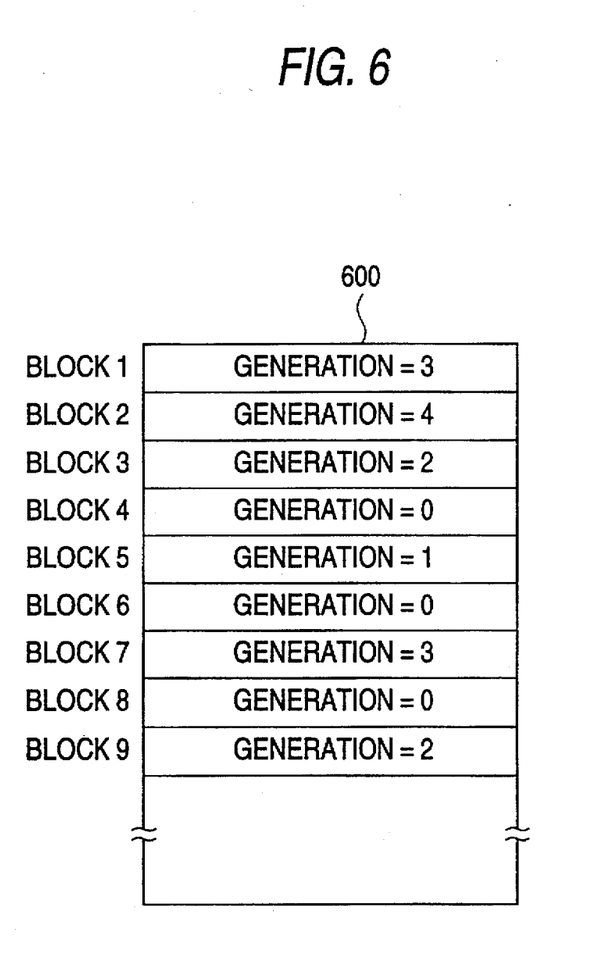
FIG. 6 is a diagram showing difference map information in the first embodiment of the invention.

FIG. 6 shows difference map information 600 in which a change history for each block is stored; the latest update incremental backup generation number is registered for each block. The top entry of the difference map information 600 indicates that block 1 has been updated in generation 3, and the next entry indicates that block 2 has been updated in generation 4. Each entry with generation 0 indicates that the block is not updated.

The meta-data 400 and the number-of-update-blocks table 500 are contained in management information of logical disk unit and the difference map information 600 is contained in the logical disk unit itself.

The backup and backup generations will be discussed.

Whenever incremental backup is performed, a new backup generation number is given to the backup. When full backup is executed, generation number 0 is given to the backup. Then, when data is updated in the disk unit or logical disk unit, the next backup generation 1 is stored in the difference map information 600 storing data indicating whether or not the block is updated. When incremental backup is executed, data in the block with backup generation 1 registered in the difference map information 600 is saved. After the completion of the incremental backup, when data is furthermore updated in the disk unit, backup generation 2 is registered in the difference map information 600 storing data indicating whether or not the block is updated.

Data indicating whether or not blocks have been updated is thus registered in the difference map information 600 over backup generations.

The application program 201 in the first embodiment of the invention references and updates disk data, and disk data change made by the application program 201 is always reflected on the disk. Therefore, if disk data is backed up at any point in time during execution of the application program 201, consistency of the disk data viewed from the application program 201 is maintained.

The application program 201 accesses disk data synchronously through the difference management mechanism 203. When the application program 201 issues a write instruction, another process is not started until the write into the disk unit is complete. Therefore, if access to the disk unit is inhibited at the time of backup execution by the difference management mechanism 203, when the application program 201 issues a disk access instruction to the operating system 202, the execution stops. This means that execution of the application program 201 can be stopped without concern of the application program 201 during execution of full backup or incremental backup by the difference management mechanism 203.

Next, how the invention is applied to the embodiment will be discussed along the actual operation.

Figure 7:
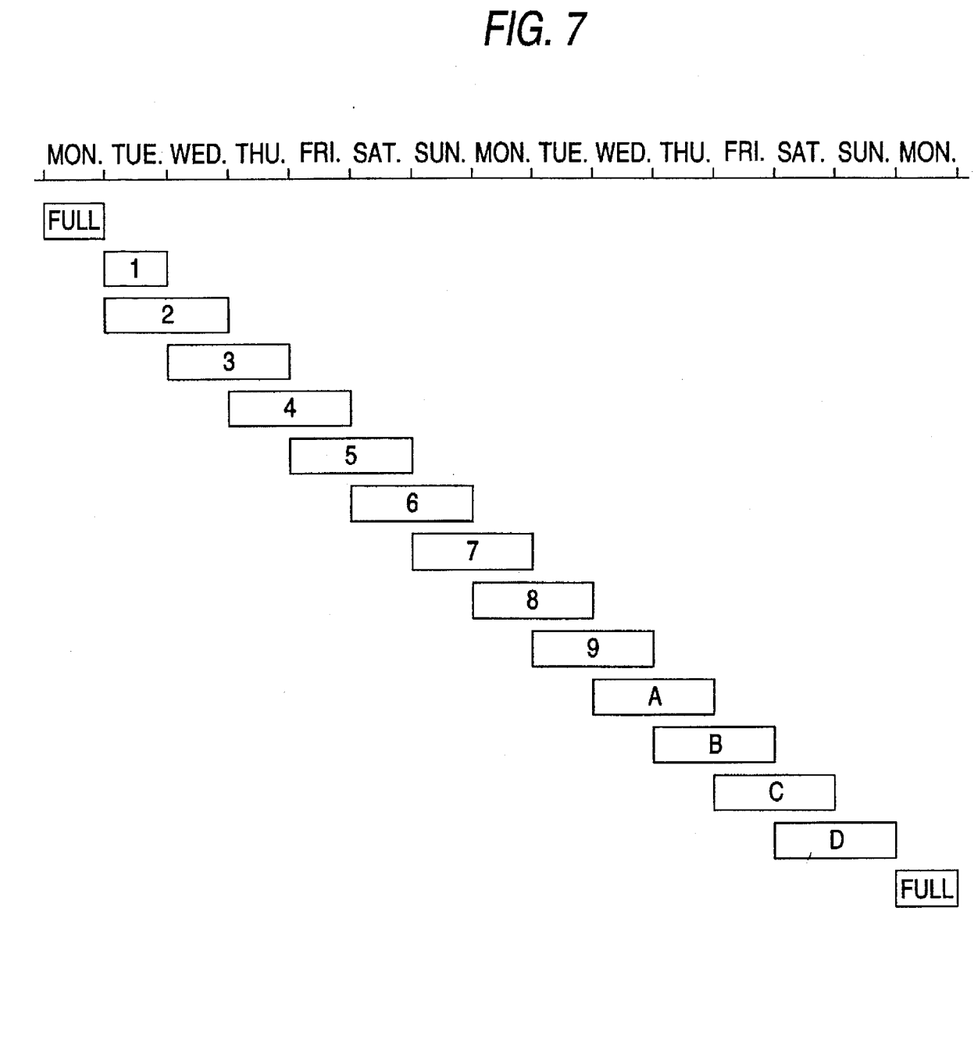
FIG. 7 is an illustration explaining incremental backup in the first embodiment of the invention.

FIG. 7 is an illustration explaining an example of the operation of incremental backup.

For the user of the system, Monday every two weeks is a holiday. Full backup is executed on the holiday and incremental backup is executed on business days for backup operation. In FIG. 7, FULL denotes full backup and digits denote incremental backup generation numbers. The difference data occurring on Tuesday, the first business day since the full backup is held at the incremental backup time with number 1. The difference data occurring on Tuesday and Wednesday is held at the incremental backup time with number 2, the difference data occurring on Wednesday and Thursday is held at the incremental backup time with number 3, and the difference data occurring on Thursday and Friday is held at the incremental backup time with number 4. The reason why 2-day difference data is thus backed up duplicately on each business day except the first business day since the full backup is to cope with an unexpected fault on the tape unit in which the backup data is stored.

For the description which follows, a pseudo device driver interface in the UNIX system and the logical volume management mechanism 206 adopted as a disk management mechanism in the difference management mechanism 203 will be discussed.

The pseudo device driver is defined as a device driver having no actual device in the UNIX system and does not manage any actual device; an interface like a normal device driver interface is defined between the difference management mechanism 203 and the UNIX operating system. The application program can use system calls such as open, close, read, write, and ioctl to indirectly call pseudo device driver subroutines. If the pseudo device driver is defined as a block device, it can also be used from a file system, etc., through a strategy interface.

In the first embodiment of the invention, the difference management mechanism 203 is built in the system as a pseudo device driver under the control of the operating system. At the incremental backup time, namely, when a read request is issued to the pseudo device driver, the difference management mechanism 203 has a function of collecting the difference map information 600, the block data updated in the backup generation known from the difference map information 600, and the location of the block data in the logical disk unit and sending them as data.

When the incremental backup data is restored, namely, when the difference map information 600 and block data gotten as the incremental backup data are written into the pseudo device driver, the difference management mechanism 203 has a function of restoring the block data to the disk unit or the logical disk unit where the backup in the generation to reproduce the difference data is complete, based on the received difference map information 600.

The interface of the difference management mechanism 203 is used as the pseudo device driver interface and the above-mentioned functions are provided, whereby a simple incremental backup and restore interface can be provided.

The logical volume management mechanism 206 can be built in the system as a pseudo device driver for receiving input/output requests made by the above-mentioned system calls from the application program 201. Therefore, the logical volume management mechanism 206 assumes access information to the physical disk unit 111, 112 by the application program 201 as access to a virtual logical disk unit and distributes the contents to the actual disk units 111 and 112 making up the logical disk unit. The difference management mechanism 203 receives input/output requests from the application program 201 through the logical volume management mechanism 206 interface.

Next, full backup will be discussed.

At the backup start time, the system manager uses the control command 207 to specify the disk units 111 and 112 to be backed up and the tape drive 108 used for the backup for executing full backup. At this time, the difference management mechanism 203 uses the logical volume management mechanism 206 to check whether or not the memory and disk area required for executing the later incremental backup can be reserved. If they can be reserved, at the completion of the full backup, the control command 207 informs the system manager that the later incremental backup is enabled; if not, the control command 207 informs the system manager that they cannot be reserved.

The logical volume management mechanism 206, which makes up a virtual logical disk unit of disk resources under the management of the mechanism 206, is at liberty to reserve a management data storage area for incremental backup so long as there are unassigned disk resources among the managed disk resources. The management data for the incremental backup for which the logical volume management mechanism 206 reserves the storage area includes the difference map information 600 shown in FIG. 6.

Next, area reservation and initialization of the management data for the incremental backup will be discussed. The flowchart in FIG. 3 shows the operation of the area reservation and initialization of the management data by the difference management mechanism 203 at the full backup time.

First, a check is made to ensure that the size of the specified logical disk unit, which will be hereinafter referred to as a volume, is greater than the block size on the difference management at step 301. The block size 2 KB is given as configuration data in the embodiment of the invention. Next, how many blocks for the difference map information 600 the specified volume requires is calculated and whether or not a storage area of the difference map information 600 can be reserved is checked at step 302. In the embodiment of the invention, four bits are assigned to each entry of the difference map information 600. (Therefore, the maximum backup version that can be supported in the embodiment is 15.) Since the volume size is 2 GB, the difference map information 600 requires 512 KB.

Next, at step 303, the storage area of the difference map information 600 is reserved. At step 304, the difference map information 600 and other management data, the meta-data 400 in FIG. 4 and the number-of-update-blocks table 500 in FIG. 5 are initialized.

In the initialization process, for the meta-data 400 in FIG. 4, executing flag 401 indicating that incremental backup is being executed is set to ON and current effective difference generation number 402, size 403 of the difference map information 600, logical disk name 404 of the logical disk on which the difference map information 600 is stored, storage location 405 of the difference map information 600 on the logical disk, block size 406, and the number of entries 407 of the difference map information 600 are registered as shown in FIG. 4. Since the superset of the meta-data 400 is also expanded in the memory, address 408 of the difference map information 600 held in the memory, and volume name and size of volume to be backed up, 409 and 410, are registered in the table in the memory for convenience in addition to the above-mentioned information entries.

For the number-of-update-blocks table 500, entries 0 to 15 are initialized to 0. However, incremental backup number 0 corresponds to full backup and entry 0 is not used.

For the difference map information 600, the entire storage area of the difference map information 600 reserved at step 303 is initialized to 0.

Next, at step 305, the start of getting the difference map information is declared and at step 306, the current backup generation is set to 1.

After this, the meta-data 400 for incremental backup and all volume data are written into full backup data.

The initialized state is thus set by the full backup by the control command 207. The operation of the difference management mechanism 203 at the subsequent volume access time from the application program 201 will be discussed with reference to a flowchart in FIG. 8.

Figure 8:
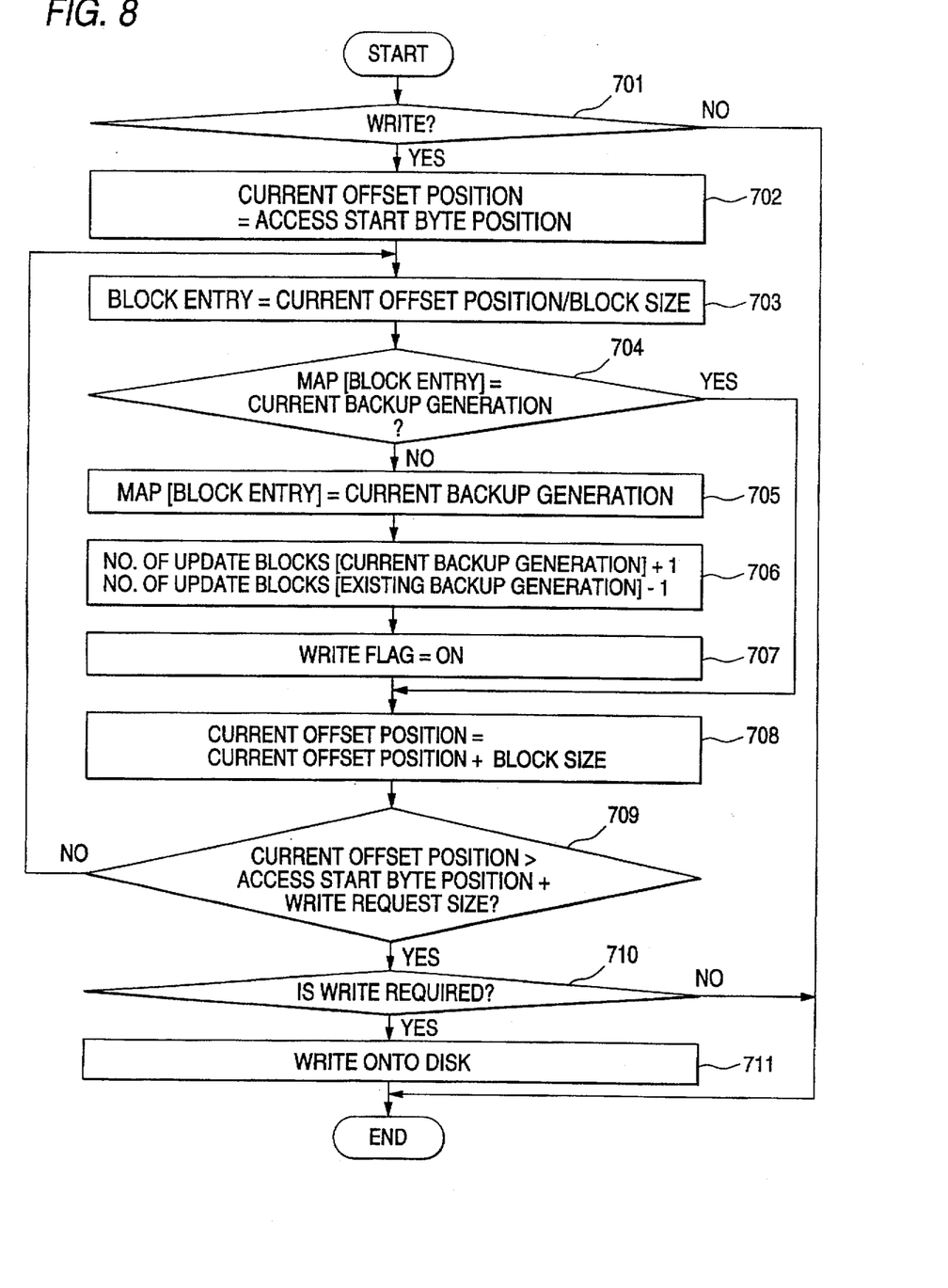
FIG. 8 is a flowchart of difference record logic at the application program operation time in the first embodiment of the invention.

The difference record logic executed by the difference management mechanism 203 is executed just after volume access. Upon completion of the execution of the difference record logic, the volume access is assumed to be complete. This means that the difference record logic always operates synchronously with the disk access.

First, whether the volume access is read or write is determined at step 701. If it is read, difference record is not required and execution is terminated without performing any operation. At step 702, the access start byte position to the volume is registered as the current offset position in the process. At step 703, the block corresponding to the current offset is found. At step 704, the difference map information 600 is referenced and if the incremental backup generation with the most recent change made in the block equals the current backup generation, the entry of the difference map information 600 need not be updated. If the incremental backup generation does not equal the current backup generation, the latest update generation management mechanism 204 sets the current backup generation in the entry of the difference map information 600 at step 705. For the number-of-update-blocks table 500, the number-of-update-blocks management mechanism 205 adds one to the number of update blocks in the current backup generation and subtracts one from the number of update blocks in the registered backup generation at step 706. A flag indicating that the difference map information 600 and the number-of-update-blocks table 500 need to be written onto the disk is set to ON at step 707. Next, the block size is added to the current offset position at step 708 and whether or not the current offset position is inside the disk area for which the write request is made is determined at step 709. These steps are executed for all blocks corresponding to the disk area for which the write request is made. Upon completion of processing for all blocks, whether or not disk write is required is determined at step 710. If the disk write is required, it is executed and the process is terminated at step 711.

Next, incremental backup will be discussed.

To execute the incremental backup, if the system manager wants, he or she can also ask the control command 207 about the tape capacity required for the backup from the number-of-update-blocks table 500 before tape is loaded.

At the termination of business on Tuesday with the incremental backup generation as 1, the incremental backup in generation 1 is executed by the control command 207. When the incremental backup with the generation scope as 1 is requested of the control command 207, the control command 207 informs that the incremental backup scope is 1 through the ioctl interface of the logical volume management mechanism 206. After this, the control command 207 simply executes read from the pseudo interface and simply writes into the tape drive. When a read request comes through the pseudo interface, the difference management mechanism 203 references the current incremental backup generation and the scope, searches the difference map information 600 for the corresponding block, and creates sequential data as shown in FIG. 9.

Figure 9:
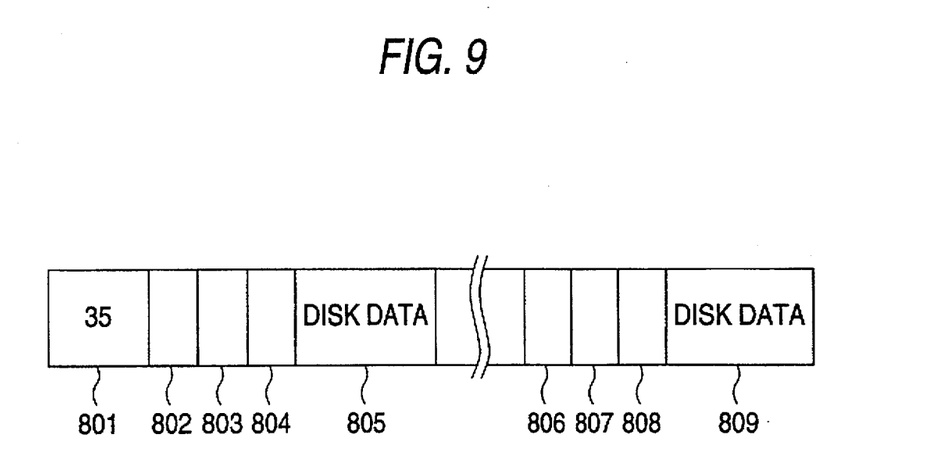
FIG. 9 is a diagram showing incremental backup data stored on backup media created in the incremental backup system in the first embodiment of the invention.

The number of difference blocks 801 applying to the scope is recorded at the top of the sequential data in FIG. 9. Since the current backup generation is 1 and the scope is 1, the number of blocks with 1 registered as the latest update generation is retrieved from the number-of-update-blocks table 500 and is set in the number of difference blocks 801.

In FIG. 9, 35 is set in the number of difference blocks 801. When the difference map information 600 is searched for a block having generation number 1 and the block is found, block position 802, generation number 803, check sum data 804 of the disk area corresponding to the block, and disk data 805 corresponding the block are set. After this, similar operation is performed for each found block and the data is returned to the host appropriately. A data set of entries 806 to 809 is similar to the data set of entries 802 to 805. Upon completion of all data transmission to the host, one is added to the current backup generation as the backup generation from the next disk update.

The check sum data 804 is 2-byte data resulting from adding 100-byte data to be checked two bytes at a time 50 times in order, for example. The check sum data 804 is previously found and held. If check is required, again similar additions are performed on 100-byte data, and the result is compared with the check sum data 804. If they do not equal, the 100-byte data is assumed to be invalid.

On Wednesday, the scope is set to 2 and incremental backup is executed. Processing similar to the incremental backup on Tuesday is performed for the total number of the update blocks in generations 1 and 2. The incremental backup is thus repeated to the second Sunday since the full backup.

Next, incremental backup restoring will be discussed by taking as an example, recovery executed when a fault in which the system becomes inoperative occurs on the first Thursday since the full backup.

Recovery of change data on the fault occurring day, executed with log data will not be covered. The system of the embodiment of the invention is again installed on the machine after recovery, and a volume of the same size as the volume previously backed up is reserved on the disk unit 111 or 112. Full backup restoring of the control command 207 is executed for the volume, whereby the meta-data 400 for the incremental backup is restored in the volume management information and the full backup data is restored on the volume.

The system manager uses the restore function of the control command 207 to restore incremental backup tape in order. The difference management mechanism 203 uses the check sum data 804 to check the data received from the control command 207 for validity and if the data is valid, restores the data to the corresponding volume area according to the block position shown in FIG. 9. If tape data is found invalid in the check with the check sum data 804, the system manager is informed of the incremental backup generation number.

In the restoring, tape in incremental backup generation 1 prepared on Tuesday and tape in incremental backup generations 2 and 3 prepared on Thursday may be restored. If the tape in incremental backup generation 1 prepared on Tuesday contains an error, tape in incremental backup generations 1 and 2 prepared on Wednesday and the tape in incremental backup generations 2 and 3 prepared on Thursday may be restored. If the generation 2 part of the tape in incremental backup generations 2 and 3 contains an error, after the tape in incremental backup generations 1 and 2 is restored, the tape in incremental backup generations 2 and 3 may be restored with restoring the generation 2 part inhibited.

As in the description made so far, according to the first embodiment of the invention, to back up data for one or more large-capacity disk units, only the difference data since the previous backup execution time may be backed up after the first full backup, so that the time required for the backup execution can be shortened.

Further, one or more incremental backup generations contiguous to the latest incremental backup generation can be collected into one incremental backup generation.

The user can use a sequential read/write command, such as a dd command in the UNIX system, via the pseudo device driver interface to save difference block management data and difference data on sequential access storage media like tape without considering the actually updated blocks. To restore incremental backup data, the incremental backup data saved via the pseudo device driver interface can be written into the pseudo device driver interface in sequence for the backup volume where data to the generations preceding the incremental backup is already restored.

Further, the pseudo driver interface is provided with a function of adding check sum data for each block data and the check sum data for each block data is stored, thereby improving reliability of the incremental backup data.

If data is compressed and stored on the save volume at the incremental backup time and the compressed data is decompressed and restored at the incremental backup data restoring time, the data amount of the incremental backup data can be reduced and the effective use of the backup media can be made.

Figure 10:
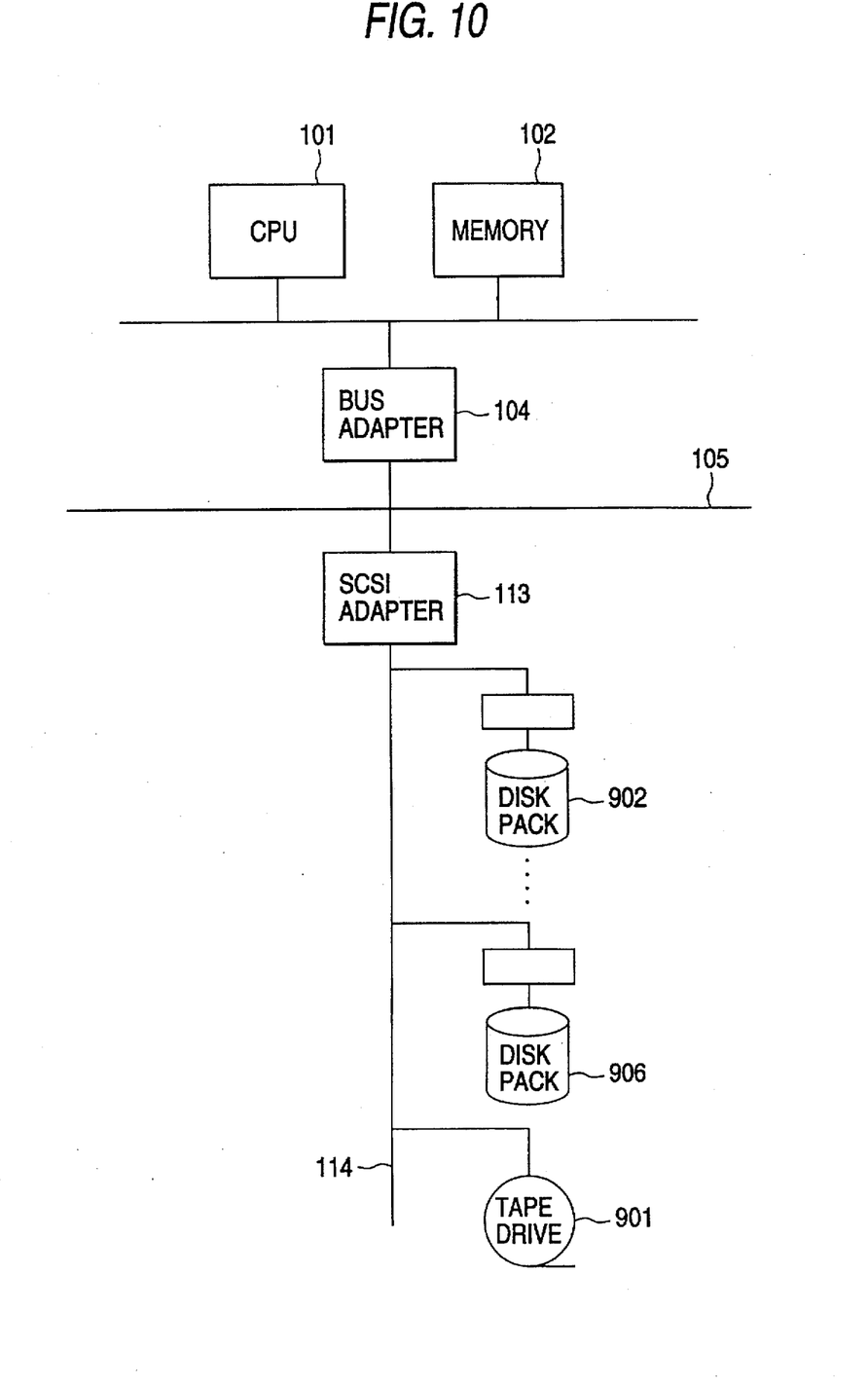
FIG. 10 is a block diagram showing the hardware configuration of an incremental backup system according to a second embodiment of the invention.

Embodiment 2:

FIG. 10 is a block diagram showing the hardware configuration of an incremental backup system in a second embodiment of the invention. Components identical with or similar to those previously described with reference to FIG. 1 are denoted by the same reference numerals in FIG. 10 and will not be discussed again.

In FIG. 10, numeral 113 is an SCSI adapter as a controller connected to an input/output bus 105; a difference management mechanism 203 is provided as an adapter function by firmware. Numeral 114 is an SCSI bus deriving from the SCSI adapter 113 and numerals 902 and 906 are disk packs connected to the SCSI bus 114. In addition to the two disk packs 902 and 906, three disk packs 903–905 (not shown) are also connected to the SCSI bus 114. Numeral 901 is a tape drive in which backup of data in the disk packs 902–906 is stored. The disk packs 902–906 are to be backed up by an incremental backup function provided by the SCSI adapter 113.

Figure 11:
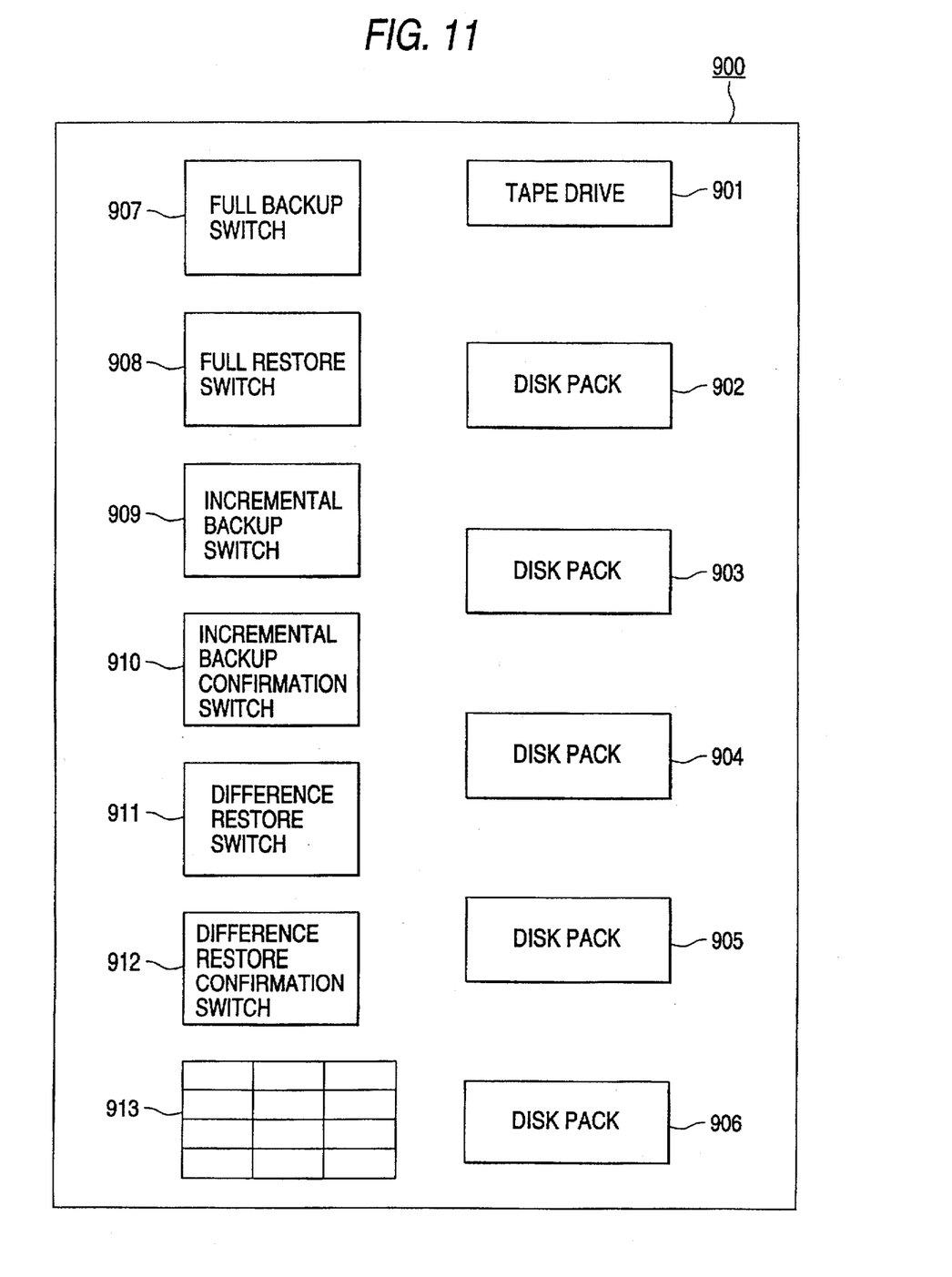
FIG. 11 is a schematic diagram showing a front panel of a disk unit with an incremental backup function in the second embodiment of the invention.

From an operating system, it appears that the five disk packs 902–906 each containing an SCSI controller at target level are connected to the SCSI adapter 113. The SCSI specifications allow a maximum of eight target controllers on a single bus, three of which (ID7, ID6, and ID5) are used by a map storage disk of a disk unit 900 with an incremental backup function having a front panel shown in FIG. 11, the tape drive, and the SCSI adapter 113, and cannot be used by the operating system. In FIG. 11, tape drive 901 and disk packs 902–906 are mounted. The tape drive 901 and disk packs 902–906 in FIG. 11 are the same as those in FIG. 10. Numeral 907 is a full backup switch, numeral 908 is a full restore switch, numeral 909 is an incremental backup switch, numeral 910 is an incremental backup confirmation switch, numeral 911 is a difference restore switch, numeral 912 is a difference restore confirmation switch, and numeral 913 is a ten-key pad.

An application program and the operating system in the second embodiment of the invention are the same as those in the first embodiment of the invention. Since a device driver of the unit does not time out, the application program using the disk packs 902–906 in the unit automatically stops during execution of backup or restoring by the unit. Therefore, the system manager can execute backup by the unit at any time.

To execute full backup, the system manager mounts tape on the tape drive 901 and uses the ten-key pad 913 to specify the disk packs 902–906 to be backed up. Then, when he or she presses the full backup switch 907, the full backup is executed.

To execute incremental backup, the system manager mounts tape on the tape drive 901, then uses the ten-key pad 913 to specify the disk packs 902–906 for which the incremental backup is to be executed, presses the incremental backup switch 909, uses the ten-key pad 913 to specify the scope, and presses the incremental backup confirmation switch 910.

To execute full restoring, the system manager mounts tape on which full backup data is stored on the tape drive 901, uses the ten-key pad 913 to specify the disk packs 902–906 to which the full backup data is to be restored, and presses the full restore switch 908.

To execute difference restoring, the system manager mounts incremental backup tape on the tape drive 901, uses the ten-key pad 913 to select the disk packs 902–906 to which the incremental backup data is to be restored and specify the latest generation and scope contained in the backup tape, and presses the difference restore confirmation switch 912.

As in the description given so far, according to the second embodiment of the invention, the SCSI adapter 113 for controlling the disk unit 900 for storing data to be baked up and the tape drive 901 for storing backup data is provided and the difference management mechanism 203 is provided in the SCSI adapter 113, whereby incremental backup and restoring can be performed without burdening the operating system or software under the operating system control.

According to the invention, the latest backup generation in which data in each block has been updated is recorded in the difference map information for each block of the storage unit storing the data to be backed up and based on the difference map information, the data in the block updated in the backup generation specified by the user is input and backed up. Thus, only the data updated since the latest backup is backed up and the time required for the backup execution can be shortened.

When incremental backup is executed, if one or more backup generations contiguous to the latest backup generation are specified, they are collected into one backup generation for backup. Thus, efficient backup work can be executed in such a manner that backup is not executed on a day with less update data and that backup is executed in batch on a later day.

Data in more than one backup generation can be stored on one backup medium. Thus, even if one backup medium cannot be read, another backup medium can be used to reproduce the backup data; highly reliable backup work can be executed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An incremental backup system, comprising:

a storage unit for storing data to be backed up, said storage unit being separated into a plurality of block units of a predetermined size and accessed according to the block units;

difference map information being stored in said storage unit and including for each block a latest backup generation number referencing a generation in which data has been updated in a block;

generation recording means for recording the latest backup generation number in said difference map information corresponding to a block in which data has been updated;

a backup unit for storing backup data; and incremental backup means for inputting and storing backup data in said backup unit, the backup data including data stored in a block of said storage unit which is updated in a specified backup generation based on said difference map information, a position of the block in said storage unit, and a backup generation in which the block has been updated.

2. An incremental backup system as claimed in claim 1, further comprising full backup means for storing all of the data in said storage unit into said backup unit and initializing the backup generation numbers, wherein said incremental backup means updates the backup generation numbers after the backup data is stored.

3. An incremental backup system as claimed in claim 2, wherein said full backup means reserves an area for storing said difference map information in said storage unit and initializes said information.

4. An incremental backup system as claimed in claim 2, further comprising a controller for controlling said storage unit and said backup unit, said controller including said generation recording means, said incremental backup means, and said full backup means.

5. An incremental backup system as claimed in claim 1, wherein said incremental backup means comprises:

difference management means for outputting data, the data including data in a block of said storage unit updated in a specified backup generation based on said difference map information, a position of the block in said storage unit, and the backup generation in which the block has been updated; and a control command for storing the data outputted by said difference management means in said backup unit as backup data.

6. An incremental backup system as claimed in claim 1, further comprising difference restoration means for inputting the backup data stored in said backup unit and restoring the input block data to said storage unit based on the position of the block in said storage unit recording and the backup generation in which the block has been updated in said difference map information.

7. An incremental backup system as claimed in claim 6, wherein said difference restoration means comprises:

a control command for inputting the backup data stored in said backup unit and outputting the inputted backup data; and difference management means for inputting the backup data outputted by said control command and restoring the input block data to said storage unit based on the position of the block in said storage unit recording and the backup generation in which the block has been updated in said difference map information.

8. An incremental backup system as claimed in claim 6, wherein said incremental backup means stores check sum data corresponding to each block in said backup unit; and wherein said difference restoration means uses the check sum data stored in said backup unit to check whether or not the block data stored in said backup unit is valid.

9. An incremental backup system as claimed in claim 1, further comprising number-of-update-blocks information for recording the number of data-update blocks for each backup generation; and number-of-update-blocks recording means for adding the number of update blocks to said number-of-update-blocks information corresponding to the latest backup generation when the data is updated.

10. An incremental backup system as claimed in claim 9, further comprising a control command for inputting said number-of-update-blocks information and outputting the number of update blocks in said number-of-update-blocks information corresponding to the specified backup generation.

11. An incremental backup system as claimed in claim 1, wherein said storage unit is a virtual logical disk unit made up of physical disk units.

* * * * *